Figure 1:
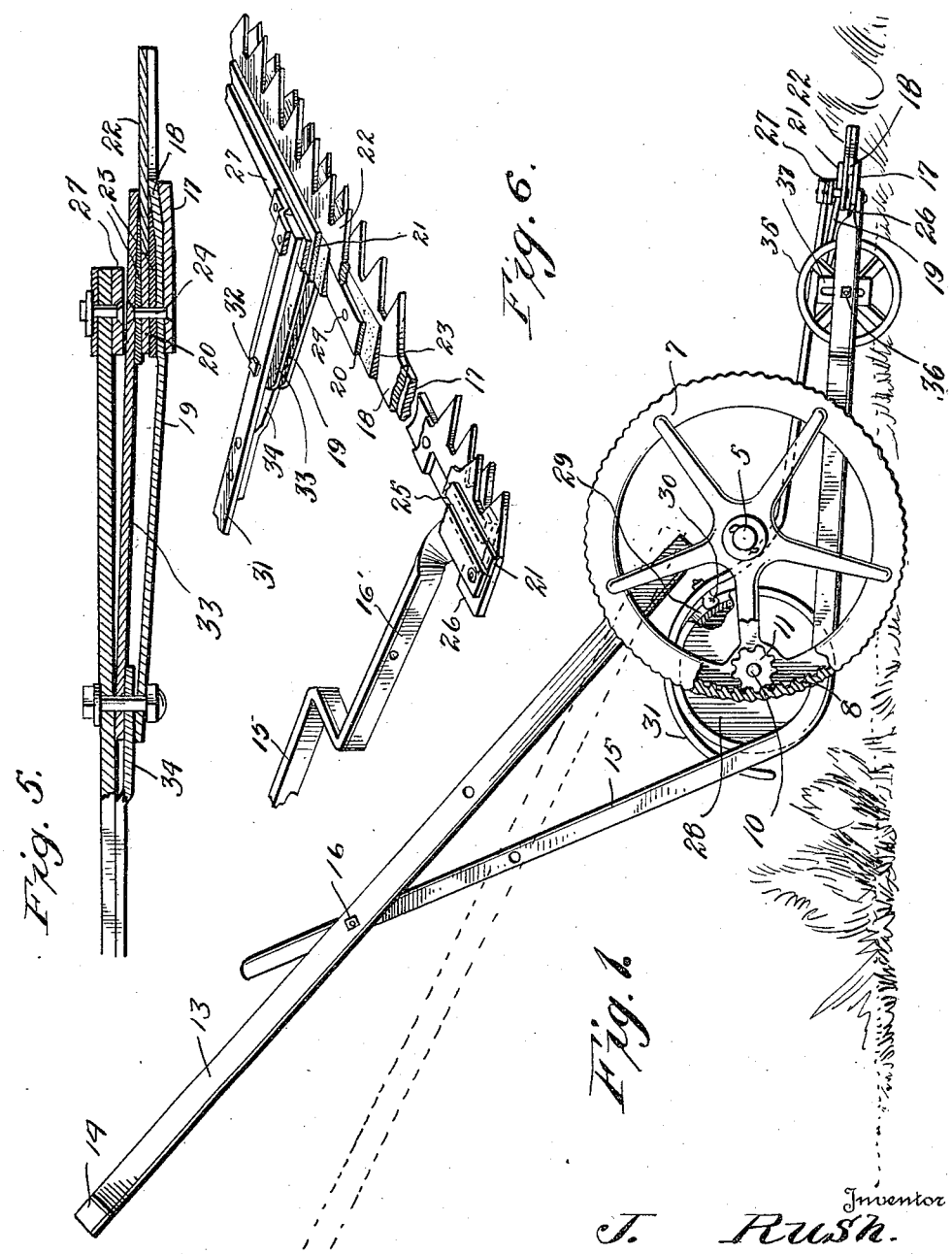

J. RUSH.
LAWN MOWER.
APPLICATION FILED DEC. 15, 1913.

1,122,542.

Patented Dec. 29, 1914.
2 SHEETS—SHEET 1.

J. RUSH.
LAWN MOWER
APPLICATION FILED DEC. 15, 1913.
1,122,542.
Patented Dec. 29, 1914.
2 SHEETS—SHEET 2.
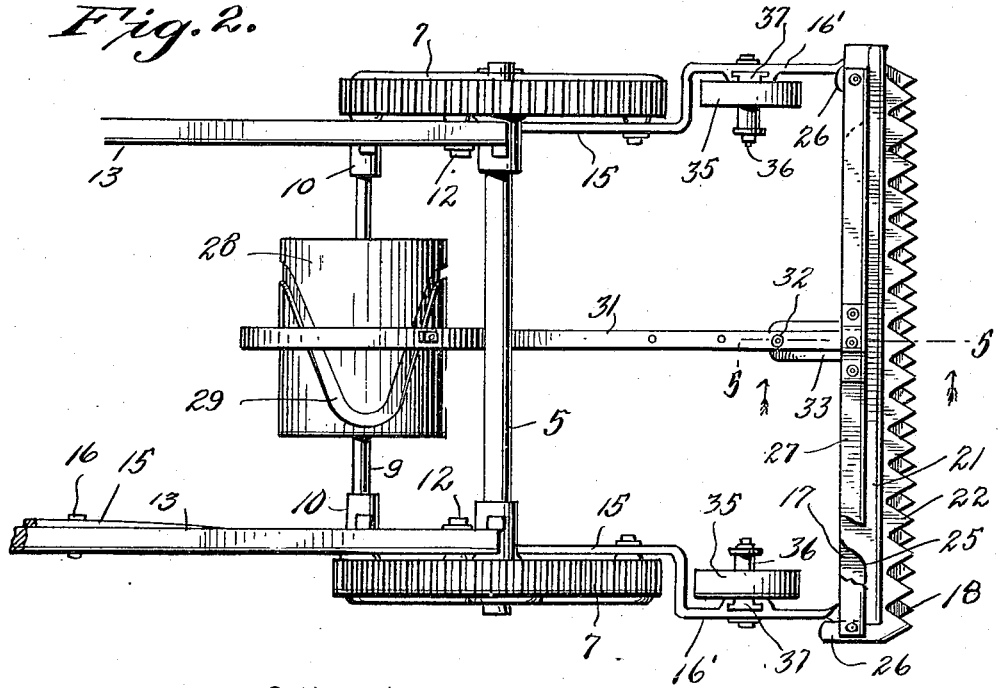
Fig. 2.
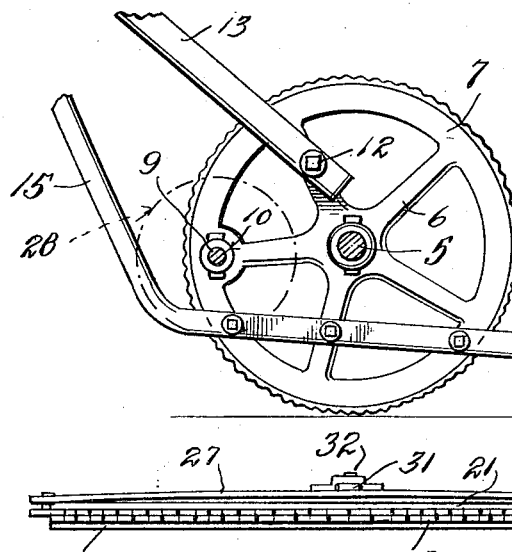
Fig. 3.
Fig. 4.
Witnesses
Inventor
J. Rush
By
Attorney

UNITED STATES PATENT OFFICE.

JACOB RUSH, OF SALEM, INDIANA.

LAWN-MOWER.

1,122,542. Specification of Letters Patent. Patented Dec. 29, 1914.

Application filed December 15, 1913. Serial No. 806,858.

*To all whom it may concern:*

Be it known that I, JACOB RUSH, a citizen of the United States, residing at Salem, in the county of Washington, State of Indiana, have invented certain new and useful Improvements in Lawn-Mowers; and I do hereby declare the following to be a full, clear, and exact description of the invention, such as will enable others skilled in the art to which it appertains to make and use the same.

This invention relates to new and useful improvements in mowing machines and particularly to lawn mowers embodying the principle of a reciprocating cutter bar.

An object of the present invention resides in the provision of a lawn mower of the above type having its parts so arranged as to lessen the racking incident to the operation of the cutter bar and to so assemble the various elements of the device that they are efficient and durable in use and present no likelihood of getting out of order.

A further object of the invention resides in the provision of means associated with the cutter bar mechanism whereby the movable portions thereof are supplied with oil.

A still further object of the invention resides in the provision of a machine of the above character provided with a minimum number of parts so that it may be manufactured at a low cost.

With these and other objects in view, the invention resides in the novel combination, formation and arrangement of parts to be more fully hereinafter described and particularly pointed out in the claims hereto appended.

Reference is had to the accompanying drawings wherein similar characters of reference designate corresponding parts throughout the several views, and in which:

Figure 1 is a side elevation of the improved lawn mower, with an adjusted position of the handle shown in dotted lines, Fig. 2 is a top plan view of the lawn mower, Fig. 3 is a vertical longitudinal sectional view therethrough, Fig. 4 is a front elevational view of the cutter mechanism, Fig. 5 is a sectional view through the cutter mechanism and actuating bar at their point of connection and Fig. 6 is a perspective view of the cutter mechanism.

Referring now more particularly to the accompanying drawings, 5 designates the main shaft of the machine to which is secured adjacent each end thereof the spider end members 6. Loosely mounted on the shaft outwardly of the end members are the ground engaging wheels 7 carrying on their inner peripheries the usual gear teeth 8. Journaled in bearings 9 at the rear portion of the end members 6 is a shaft 10 carrying the gear pinions 11 meshing with the gears 8 to thus rotate the said shaft when the machine is propelled.

Pivoted at 12 to each member 6 is a handle portion 13, said handle portions being connected at their free ends by the usual cross bar 14. For carrying the cutter mechanism and supporting the handles at any desired angle, bars 15 are provided which are secured to the end members 6 below the shaft and which have their rear portions upwardly extended and bolted at 16 to the handles. Thus it is observed should it be desired to mow grass on a bank from a different level, the handles may be disconnected from the bars and swung downwardly to a more convenient position.

Forwardly of the wheels 8 the bars 15 are outwardly offset to form the portions 16' and the free ends of these portions are given a quarter twist whereby the horizontal cutter base 17 may be more readily secured thereto. Positioned on the cutter base is a stationary cutter bar 18 having its teeth extended outwardly thereof and having at its central portion a rearward extension 19. Disposed horizontally on the rear portion of the bar 18 is a spacing bar 20 and disposed over the bar 20 is a shield plate 21, the movable cutter bar 22 being disposed outwardly of the spacing bar. In order that oil may be stored adjacent the cutter bars, strips 23 of packing are disposed between the shield plate 21 and the spacing bar and the stationary cutter bar all of said last-named parts being secured together by the rivets 24.

For reciprocating the cutter bar 22, the rear end portions of the shield plate are cutaway as at 25 and the movable cutter bar 22 is provided with rearward extensions 26 to which are secured the ends of an upwardly bowed connecting rod 27. Fixed centrally on the driven shaft 10 is a drum 28 provided on its periphery with a continuous cam groove 29 in which is seated a suitable projection 30 on the under face of a bar 31 whereby rotation of the drum will reciprocate the bar. The bar is extended under the shaft 5 and forwardly and is pivoted adjacent its forward end by a bolt 32 passed through said bar, to a rearward extension 33 on the central portion of the shield plate. A parallel finger 34 is carried by the bar and disposed between the extension 33 and the similar extension 19 of the cutter bar 18. The bolt 32 also passes through the finger 34 and the extension 19. It is observed that the drum is at the rear portion of the machine and the pivotal connection of the bar 31 is adjacent the front portion so that the rear end of the bar 31 has a comparatively slow reciprocation while the movable cutting bar is being reciprocated rapidly, thus lessening any tendency to rock the rear end of the bar 30. By passing the bar under the shaft 5, it is held against displacement from the periphery of the drum.

The cutter mechanism is supported from the ground by wheels 35 which have their journal shafts 36 carried by upright members 37 secured to the inner faces of the offset portion 16' of the bars 15.

It is observed that by the above construction the cutter bar mechanism extends across the entire width of the machine. By the provision of the oil packing 23, a simple and cheap means is provided whereby oil may be constantly fed to the engaging faces of the cutter bars.

What is claimed is:

A cutter mechanism comprising a base bar, a stationary cutter bar disposed thereon, a spacing plate disposed on the rear portion of the stationary bar, a shield member disposed on the spacing member, strips of packing disposed between the stationary cutter bar and the spacing plate and between the spacing plate and the shield member and adapted to be saturated with oil, a reciprocating cutter bar disposed between the shield member and the stationary cutter and means for reciprocating said movable cutter bar.

In testimony whereof, I affix my signature, in the presence of two witnesses.

JACOB RUSH.

Witnesses:
JOHN M. COLGLAZIER,
JOHN A. GORDON.

Copies of this patent may be obtained for five cents each, by addressing the "Commissioner of Patents Washington, D. C."